United States Patent Office 2,726,169
Patented Dec. 6, 1955

2,726,169

PROCESS OF STABILIZING WOOD BY TREATING IT WITH HALOGENATED ETHERS

Monie S. Hudson, Spartanburg, S. C.

No Drawing. Application August 12, 1953,
Serial No. 373,923

7 Claims. (Cl. 117—57)

This invention relates to dimensional stabilization of wood, that is, the treatment of wood to minimize swelling when it becomes wet and the usual shrinkage upon drying of the wood. More specifically, the invention is concerned with a process of chemically modifying wood by treatment thereof with certain specific chemicals to provide the desired dimensional stabilization.

Chemical modification of wood to effect stabilization has been attempted heretofore but with only limited success. These treatments are intended to change the nature of the wood itself to decrease its affinity for water, and the prior chemical treatments for this purpose comprise generally, acetylation, allylation or treatment with formaldehyde. The latter has shown the most promise because it requires relatively small amounts of the chemical for effecting the reaction between formaldehyde and hydroxyls of the cellulose molecules to link the latter together laterally by cross-bridges or acetal linkages, whereby the hydroxyls would no longer be hydrophilic to take up water into the micellar structure. One of the principal disadvantages of this formaldehyde treatment is that it involves usually anhydrous conditions and very corrosive acids as the catalyst. The catalyst has to be used at such high concentration that the pH of the wood would be far below pH 1. This low pH value causes extensive hydrolytic and oxidative degradation of the wood, which virtually destroys the strength of the wood before dimensional stabilization can be obtained.

The present invention overcomes the above and other disadvantages of the prior art procedures which involve chemical reaction of the wood to change its hydroscopic nature. The process of my present invention does not require the highly acid condition that characterizes the above formaldehyde process and furthermore does not require anhydrous conditions. On the contrary, it may be carried out satisfactorily with practically any water content in the wood.

In accordance with my invention, I have discovered that effective stabilizing of wood can be obtained by treatment thereof with certain halogenated ethers of the lower aliphatic hydrocarbons. A selected class of these chemical compounds comprises chloromethyl ether and the symmetrical and unsymmetrical dichloromethyl ethers, and a commercially advantageous example is chloromethyl ether. These compounds may be applied to the wood in the form of organic solvent solutions, illustrative examples of which are identified hereafter, and in concentrations of about 1.0% to 10% solutions.

The wood may be impregnated with the solvent solutions of the selected halogenated ether by cold soaking processes or by pressure processes, and the impregnation treatment may vary from a few minutes time to as much as 12 to 24 hours, depending on the species of wood being treated, its dimensions and other factors.

After treatment of the wood with the selected chemical solution, the wood is exposed to elevated temperature for a suitable time, which will vary generally with the temperature used. I have found that the amount of dimensional stabilization obtained for a given heat treating time increases with elevation of the temperature up to about 100° C., after which it begins to level off, and the maximum dimensional stability is obtained at about 100° C. to 150° C. A typical time and temperature for thin stock is about four hours at 100° C. to effect maximum dimensional stabilization. However, equal dimensional stability can be obtained at lower temperatures than 100° C. by extending the time of exposure of the wood to the heat treatment. The latter may be carried out by any suitable means, such as oven heating, electronic heating, vapor heating, etc.

As above suggested, the dimensional stabilization of wood in accordance with this invention is obtained without serious degradation of the wood because no corrosive catalyst is required and the amount of chemical used is very small. Moreover, the operation can be carried out following previous treatment of the wood with other chemicals to absorb or neutralize any corrosive byproducts of the reaction between the wood and the ether, such as, for example, the prior treatment of the wood with buffer solutions of salts or with amines or similar compounds, or treatment of the wood with the stabilization chemical dissolved in a petroleum oil which not only acts to protect the wood against byproducts of the stabilization reaction but which also acts to increase the degree of dimensional stability. These preliminary treatments with buffer solutions, neutralizers or the like may be combined with and carried out concomitantly with the application of the stabilization chemical, and in the same solution. Although these treating chemicals are not as a rule soluble in water, I have found that they may be used with wetting agents to form aqueous dispersions or solutions and that treatment of the wood with such solutions, followed by the heating step, results in the attainment of a high degree of dimensional stability.

Testing of the treated wood to determine the effectiveness of the stabilization treatment may be carried out as follows:

Duplicate samples are cut from a piece of wood, one of which serves as an untreated control and the other subjected to the above described stabilization treatment. Both the untreated and treated pieces of wood are then thoroughly saturated with water and measurements are taken when the maximum swelling is reached. Both samples are then oven dried and the oven dry dimensions determined.

In carrying out such a procedure with southern pine, it will be found that the untreated controls will show a shrinkage of about 7 percent of the tangential dimension in drying from the water swollen condition to an oven dry condition, or conversely they would show an equal amount of swelling if oven dry wood were subjected to water soaking. If the treated specimen should show a dimensional change of 3½ percent in shrinking or swelling, then the degree of dimensional stabilization would be obtained as follows:

$$\frac{\text{(Dimensional change of control)} - \text{(Dimensional change of treated specimen)} \times 100}{\text{(Dimensional change of control)}} =$$

Percent dimensional stabilization, or anti-shrink efficiency

In the particular case cited, this would be:

$$\frac{7.0 - 3.5}{7.0} \times 100 = 50\% = \text{Percent dimensional stabilization, or anti-shrink efficiency}$$

The following are illustrative but non-limiting examples of the process of my invention:

EXAMPLE I

From a flat sawn, air dried, southern pine board, one inch thick x 6 inches wide, two sections having a length in the grain direction of 2 inches were cut. These specimens when cut measured 1 inch x 6 inches x 2 inches. One of the specimens was soaked in an 11 percent solution of dichloromethyl ether in acetone overnight. It was then subjected to oven heating at 100° C. for 4 hours. Both the untreated control and the treated specimen were impregnated with water and allowed to soak in it for 24 hours, and the tangential dimensions (the original widthwise dimensions) were determined. The specimens were then oven dried and the tangential dimensions of the oven dried wood were determined. The results of these measurements were as follows:

|  | Tangential Measurement, Inches | | Dimension Change, percent |
| --- | --- | --- | --- |
|  | Oven Dry | Water Saturated | |
| Untreated Control | 6.00 | 6.42 | 7.0 |
| Treated Specimen | 6.00 | 6.20 | 3.3 |

From these figures it can be seen that the anti-shrink efficiency obtained by this treatment was 52.9 percent.

EXAMPLE II

To show the effect on dimensional stability of (1) moisture content of the wood, and (2) the temperature to which specimens treated with dichloromethyl ether were heated, samples of wood conditioned to the moisture contents shown in Table A, were treated with 11 percent dichloromethyl ether in acetone, and then exposed to the heating temperatures shown in this table. The dimensional stability obtained in the shrinkage and swelling tests are given in the right hand column of the table.

Table A

[Southern pine soaked in 11% dichloromethyl ether in acetone, then subjected to heating periods shown.]

| No. | Moisture Content, percent | Temperature of Treatment, °C. | Time of Treatment, Hours | Dimensional Stabilization, percent |
| --- | --- | --- | --- | --- |
| 40A-1 | 9.0 | 25 | 24 | 26.5 |
| 2 | 19.4 | 25 | 24 | 24.7 |
| 3 | 29.2 | 25 | 24 | 27.6 |
| 40B-1 | 9.0 | 65 | 4 | 38.9 |
| 2 | 18.8 | 65 | 4 | 34.0 |
| 3 | 28.7 | 65 | 4 | 33.9 |
| 55B | Approx. 10 | 60 | 1 | 35.8 |
| 40C-1 | 9.0 | 100 | 4 | 45.3 |
| 2 | 18.9 | 100 | 4 | 46.1 |
| 3 | 29.0 | 100 | 4 | 49.0 |
| 55C | Approx. 10 | 100 | 1 | 44.5 |

EXAMPLE III

A series of southern pine specimens were soaked overnight in acetone solutions of dichloromethyl ether ranging from 1 percent to 5 percent. They were then heated for 4 hours at 100° C. and the dimensional stability determined. The results were as follows:

| Percent Dichloromethyl Ether | Dimensional Stability, Percent |
| --- | --- |
| 1 | 23.9 |
| 2 | 36.8 |
| 3 | 47.7 |
| 4 | 47.8 |
| 5 | 45.7 |

EXAMPLE IV

Specimens of southern pine were treated with 5 percent sodium carbonate solution and allowed to air-dry to various final moisture contents. They were then treated with 11 percent dichloromethyl ether in acetone and subsequently subjected to various temperature ranges consisting of 25° C. for 24 hours, 60° C. for 4 hours and 100° C. for 4 hours as shown in Table B.

Table B

[Southern pine pretreated with 5% Na₂CO₃ solution, conditioned to moisture contents shown, then treated with 11% dichloromethyl ether in acetone and subjected to heating periods shown.]

| No. | Moisture Content, Percent | Temperature of Treatment, °C. | Time of Treatment, Hours | Dimensional Stabilization, Percent |
| --- | --- | --- | --- | --- |
| 46A-1 | 12.0 | 25 | 24 | 33.7 |
| 2 | 21.9 | 25 | 24 | 39.5 |
| 3 | 32.1 | 25 | 24 | 35.7 |
| 46B-1 | 12.0 | 60 | 4 | 41.2 |
| 2 | 21.9 | 60 | 4 | 41.5 |
| 3 | 32.2 | 60 | 4 | 34.6 |
| 46C-1 | 11.2 | 100 | 4 | 49.9 |
| 2 | 21.8 | 100 | 4 | 44.5 |
| 3 | 31.8 | 100 | 4 | 47.6 |

EXAMPLE V

Specimens of southern pine which were air dried were treated with 5 percent solutions of dichloromethyl ether in various solvents shown in Table C and then were heated at 100° C. for 4 hours in an oven.

Table C

[Southern pine treated with 5% dichloromethyl ether in various solvents, then heated for 4 hours at 100° C.]

| Solvent | Dimensional Stabilization, Percent |
| --- | --- |
| Alcohols: | |
| Methyl | 21.1 |
| Ethyl | 11.7 |
| Isopropyl | 21.3 |
| Butyl | 23.3 |
| Allyl | 25.6 |
| Ethers: | |
| Ethyl | 30.1 |
| Dioxane | 20.7 |
| Aliphatic Hydrocarbons: | |
| Petroleum Ether | 26.3 |
| VM & P Naphtha | 24.5 |
| Stoddard Solvent | 34.9 |
| Deobase Kerosene | 34.8 |
| Aromatic Hydrocarbons: | |
| Benzene | 28.8 |
| Toluene | 30.0 |
| Xylene | 22.8 |
| Chlorinated Hydrocarbons: | |
| Dichloromethane | 44.1 |
| Methylene Chloride | 39.5 |
| Perchloroethylene | 21.1 |
| Miscellaneous: | |
| Chloroacetaldehyde | 28.5 |
| Acetaldehyde | 37.6 |
| Methylacetate | 35.2 |
| Dimethylformamide | 20.5 |
| Chloroform | 29.9 |
| Methylethylketone | 25.9 |
| Linseed Oil | 61.1 |
| Diesel Oil plus 5% Pentachlorophenol | 71.1 |
| Coal Tar Creosote | 27.2 |
| Coal Tar Creosote Fractions | 44.4 |
| Naphthenic Acid | 57.1 |
| Paraffin | 55.5 |
| Petroleum Oils: | |
| Lubinol (Heavy White Mineral Oil) | 70.4 |
| Std. Oil Co. Aromatic Tar | 67.9 |
| Sun Oil Co. No. 2 Fuel | 65.3 |
| Shell Oil Co. Solvent No. 8171 | 61.7 |
| Shell Oil Co. Medium Aromatic | 61.4 |
| Sun Oil Co. No. WS-50 | 60.9 |
| Sun Oil Co. No. WS-90 | 59.8 |
| Enjay Co. Polymer | 58.0 |
| Enjay Co. Aromatic HB | 54.0 |
| Enjay Co. No. 180 | 51.6 |
| Esso Diesel No. 208 | 61.5 |
| Esso Diesel No. 208 Fraction to 484° F | 52.4 |
| Esso Diesel No. 208 Fraction 484 to 520° F | 67.1 |
| Esso Diesel No. 208 Fraction 520 to 578° F | 71.7 |
| Esso Diesel No. 208 Residue Above 578° F | 57.8 |

EXAMPLE VI

Air dried southern pine was treated with a 5 percent chloromethyl ether solution in acetone, then subjected to 4 hours oven heating at 100° C. The dimensional stability obtained was 38.5 percent.

EXAMPLE VII

5% chloromethyl ether was first dispersed in water with a wetting agent and specimens were soaked in it overnight, then heated at 100° C. for 4 hours. Dimensional stabilization was found to be 59.3.

EXAMPLE VIII

Specimens of southern pine were pre-treated with buffer solutions of pH shown in Table D. They were then air dried and subsequently soaked overnight in a 5% dichloromethyl ether solution in acetone and heated to 100° C. for 4 hours. Subsequent swelling tests gave the dimensional stabilization values shown in Table D.

Table D

[Southern pine pretreated with buffer solutions, air dried and then treated with 5% dichloromethyl ether in acetone and heated to 100° C. 4 hours]

| No. | pH of Buffer Solution | Dimensional Stabilization, Percent |
|---|---|---|
| 169 | 7.0 | 50.4 |
| 170 | 5.0 | 52.1 |
| 171 | 4.1 | 48.7 |

EXAMPLE IX

Specimens treated with buffer solutions as in Example 8 after air drying were soaked in a 5% solution of dichloromethyl dispersed in water with 1% Ijepon jell, then were heated to 100° C. for 4 hours. The results obtained are shown in Table E.

Table E

[Southern pine pretreated with buffer solutions, air dried and then treated with 5% dichloromethyl ether plus 1% Ijepon jell dispersed in water]

| No. | pH of Buffer Solution | Dimensional Stabilization, Percent |
|---|---|---|
| 174 | 4.1 | 40.0 |
| 175 | 5.0 | 48.9 |
| 176 | 7.0 | 49.0 |

EXAMPLE X

Table F shows the results obtained when southern pine specimens were soaked in a 5% solution of dichloromethyl ether dispersed in water with 1% of the various wetting agents shown, then heated to 100° C. for 4 hours.

Table F

[Southern pine treated with 5% dichloromethyl ether dispersed in water with 1% of various wetting agents, then heated 4 hours at 100° C.]

| No. | Wetting Agent Used | Dimensional Stabilization, Percent |
|---|---|---|
| 182 | Nekal NS | 44.5 |
| 183 | Nekal NF | 58.5 |
| 184 | Ijepon Jell | 52.8 |
| 185 | Tergitol Penetrant | 50.9 |
| 186 | MP 1894 Dupont | 48.5 |

EXAMPLE XI

The effect on dimensional stabilization of pre-treatment of southern pine with 5% solutions of various amines in acetone with subsequent air drying, then treatment in 5% acetone solution of dichloromethyl ether and heating for 4 hours is shown in Table G.

Table G

[Southern pine pretreated with 5% solutions of various amines in acetone, air dried, then treated with 5% dichloromethyl ether in acetone and heated for 4 hours at 100° C.]

| No. | Amine Used in Pretreatment | Dimensional Stabilization, Percent |
|---|---|---|
| 132 | Mixed mono and Diheptyl Diphenylamines | 56.3 |
| 139 | Phenyl-β-Naphthylamine | 48.2 |
| 133 | Isoproxydiphenylamine | 46.9 |
| 135 | n-Nitroso Diphenylamine | 43.2 |
| 136 | Di-β-naphthyl-p-phenylenediamine | 42.2 |
| 134 | Parahydroxydiphenylamine | 41.7 |
| 123 | Diamylamine | 41.0 |
| 121 | Dimethylaniline | 41.0 |
| 124 | Pyridine | 37.4 |
| 120 | Diphenylamine | 33.0 |
| 142 | Alpha-naphthylamine | 30.3 |
| 119 | Orthotoluenediamine | 26.5 |
| 122 | Morpholine | 24.7 |

Although the foregoing examples are based upon the use of dichloromethyl ether and chloromethyl ether, which I have found to be commercially advantageous examples, it appears from the common characteristics and functions of the closely related halogenated ethers of the lower aliphatic hydrocarbons, containing methyl, ethyl or propyl radicals connected to the ether oxygen, that such compounds will also work satisfactorily in the process of my invention and, although they may not function as efficiently and as easily as the monochloro and dichloromethyl ethers used in the above examples, they are for the purposes of this invention considered chemical equivalents and intended to come within the scope of the appended claims. Moreover, it is evident from the effectiveness of the chloro derivatives of these ethers that the bromo-, fluoro-, and iodo compounds will in varying degrees possess the ability to dimensionally stabilize wood. Similarly, other times, temperatures and concentrations which are compatible with the procedures and results that characterize my present invention are considered to come within the purview thereof, as defined in the appended claims.

I claim:

1. A process of providing dimensional stabilization in wood comprising impregnating the wood with a solution containing approximately 1% to 10% of a halogenated ether of a lower aliphatic hydrocarbon, in which a radical selected from the group consisting of methyl, ethyl and propyl is connected to the ether oxygen, followed by heating the impregnated wood to effect chemical reaction between said halogenated ether and the cellulose of the wood.

2. A process of providing dimensional stabilization in wood comprising treating the wood with a solution of a chemical compound selected from the group consisting of monochloromethyl ether and dichloromethyl ether, then subjecting the treated wood to a heat treatment sufficiently to effect a chemical reaction between said chemical compound and the wood.

3. A process of providing dimensional stabilization in wood comprising treating the wood with an acetone solution of dichloromethyl ether, and heating the wood to at least about 100° C. to effect chemical modification of the wood.

4. A process of providing dimensional stabilization in wood comprising treating the wood with an acetone solution of chloromethyl ether, and heating the wood to at least about 100° C. to effect chemical modification of the wood.

5. A process of providing dimensional stabilization in wood comprising pretreating the wood at a pH of about 4 to 7 with a neutralizing solution for by-products of the following treatment, drying the wood, then impregnating the wood with an organic solvent solution of a chloromethyl ether, followed by heating the wood at a temperature of at least about 100° C. to effect chemical modification of the wood.

6. A process of effecting dimensional stabilization in wood comprising pretreating the wood with an acetone solution of an amine and then impregnating the wood with an acetone solution of dichloromethyl ether, and heating the wood over a period of several hours at a temperature of about 100° C.

7. A process of providing dimensional stabilization in wood comprising impregnating the wood with a petroleum oil solution containing approximately 1% to 10% of a halogenated ether of a lower aliphatic hydrocarbon, in which a radical selected from the group consisting of methyl, ethyl and propyl is connected to the ether oxygen, followed by heating the impregnated wood to effect chemical reaction between said halogenated ether and the cellulose of the wood.

References Cited in the file of this patent
UNITED STATES PATENTS

| | | |
|---|---|---|
| 2,060,902 | Stamm | Nov. 17, 1936 |
| 2,098,335 | Dreyfus | Nov. 9, 1937 |
| 2,135,030 | Boller | Nov. 1, 1938 |
| 2,145,273 | Peterson | Jan. 31, 1939 |
| 2,482,756 | Ford | Sept. 27, 1949 |
| 2,538,457 | Hudson | Jan. 16, 1951 |